Patented Jan. 8, 1935

1,987,309

UNITED STATES PATENT OFFICE 1,987,309

COLORING LEADED GASOLINE

John W. Orelup, Summit, N. J.

No Drawing. Application June 6, 1933,
Serial No. 674,545

2 Claims. (Cl. 44—9)

The present invention relates to improvements in the art of coloring gasoline. The coloring of gasoline and other petroleum distillates presents special problems as illustrated, for example, by the Isermann et al. Reissue Patent No. 16,937. In this patent it is brought out that extremely few coloring materials are available for producing a blue color in gasoline. For producing gasolines of other colors a somewhat wider range of dyes is available. However, the stability of certain colors both in respect of exposure to light and of storage in gasoline is greatly affected by the presence of lead compounds in the gasoline, as for example so-called ethyl fluid containing tetraethyl lead and modifying agents such as ethylene di-bromide and monochlor naphthalene. Thus, colors such as aniline beta naphthol and toluidine azo beta naphthol which are suitable for dyeing ordinary gasoline are found to lose color when exposed to light and in storage in solution in leaded gasoline at such a rate as to be practically useless for the purpose.

I have now discovered that ortho anisidine azo beta naphthol exhibits remarkable stability against the effects of sunlight and storage when used as a coloring material in leaded gasoline. This stability while not absolute is relatively great and is sufficient to insure the satisfactory use of the compound. Considering its similarity in structure to toluidine azo beta naphthol which, as above mentioned, is typically unstable under these circumstances, this relative stability is surprising. When dissolved in gasoline my improved compound exhibits an orange color having a slight red fluorescence. The amount used will vary in accordance with the shade desired but ordinarily from 2 to 12 ounces per ten thousand gallons will be sufficient. The quantity of tetraethyl lead employed in practice usually varies from .2 cc. to 6 cc. per gallon. The structural formula of the compound is

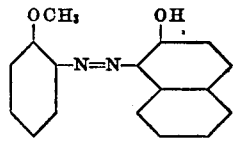

I claim:

1. The combination of a gasoline containing lead in solution and as a coloring material therefor ortho anisidine azo beta naphthol, such mixture having an orange color with slight reddish fluorescence and characterized by relatively great stability in the presence of sunlight.

2. The combination of a gasoline containing tetraethyl lead, ethylene dibromide and monochlor naphthalene in solution and as a coloring material therefor ortho anisidine azo beta naphthol, such mixture having an orange color with slight reddish fluorescence and characterized by relatively great stability in the presence of sunlight, such coloring material having the following formula:

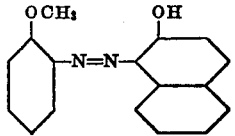

JOHN W. ORELUP.